(12) United States Patent
Cook et al.

(10) Patent No.: US 10,481,663 B2
(45) Date of Patent: Nov. 19, 2019

(54) MANAGING THE OPERATION OF POWER SUPPLY UNITS (PSUS)

(71) Applicant: Dell Products, L.P., Round Rock, TX (US)

(72) Inventors: Wayne Kenneth Cook, Round Rock, TX (US); John Erven Jenne, Austin, TX (US); Kyle E. Cross, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 228 days.

(21) Appl. No.: 15/715,788

(22) Filed: Sep. 26, 2017

(65) Prior Publication Data
US 2019/0094936 A1    Mar. 28, 2019

(51) Int. Cl.
| | | |
|---|---|---|
| G06F 1/00 | (2006.01) | |
| G06F 1/28 | (2006.01) | |
| G06F 1/30 | (2006.01) | |
| G06F 1/26 | (2006.01) | |

(52) U.S. Cl.
CPC ............... *G06F 1/28* (2013.01); *G06F 1/266* (2013.01); *G06F 1/305* (2013.01)

(58) Field of Classification Search
CPC ............. G06F 1/28; G06F 1/266; G06F 1/305
See application file for complete search history.

(56) References Cited

U.S. PATENT DOCUMENTS

| | | | |
|---|---|---|---|
| 8,232,677 B2 * | 7/2012 | Macinnes | G06F 1/26 713/330 |
| 2009/0254768 A1 * | 10/2009 | Livescu | G06F 1/3203 713/320 |

\* cited by examiner

*Primary Examiner* — Xuxing Chen
(74) *Attorney, Agent, or Firm* — Fogarty LLP

(57) ABSTRACT

Systems and methods for managing the operation of Power Supply Units (PSUs) are described. In some embodiments, a method may include: identifying a mismatch between a first Power Supply Unit (PSU) and a second PSU in an Information Handling System (IHS), disabling the first PSU, determining that a voltage at an input line of the first PSU follows a predetermined pattern while the first PSU receives a secondary bias from the second PSU, and enabling the first PSU.

20 Claims, 6 Drawing Sheets

MANAGING THE OPERATION OF POWER SUPPLY UNITS (PSUS)

FIELD

The present disclosure generally relates to electronics, and, more particularly, to systems and methods for managing the operation of Power Supply Units (PSUs).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Power Supply Units (PSUs) are devices that supply electrical power consumed by an information handling system during normal operation. In many implementations, PSUs convert a mains AC power (e.g., 120 or 240 VAC) into a low-voltage, regulated DC power source (e.g., ±5 or ±12 VDC), using switched-mode power supply (SMPS) circuitry or the like.

SUMMARY

Embodiments of systems and methods for managing the operation of Power Supply Units (PSUs) are described. In an illustrative, non-limiting embodiment, a method may include: identifying a mismatch between a first Power Supply Unit (PSU) and a second PSU in an Information Handling System (IHS), disabling the first PSU, determining that a voltage at an input line of the first PSU follows a predetermined pattern while the first PSU receives a secondary bias from the second PSU, and enabling the first PSU.

The mismatch may be identified by a Baseband Management Controller (BMC) coupled to the first and second PSUs. Additionally or alternatively, the mismatch may be identified based upon a comparison between a line status of the input line reported to the BMC by the first PSU, and another line status of another second input line reported to the BMC by the second PSU. The predetermined pattern may include a drop from a first high-voltage level to a low-voltage level, and a rise from the low-voltage level to a second high-voltage level.

In some cases, the low-voltage level may be 0 V. In these cases, the first high-voltage level, the low-voltage level, or the second high-voltage level may be selected to model: (i) coupling a power cable to a first power source, where the power cable is coupled to an input line, (ii) decoupling the power cable from the first power source, and/or (iii) coupling the power cable to a second power source.

The second high-voltage level may have a higher value than the first high-voltage level. For example, the first high-voltage level, the low-voltage level, or the second high-voltage level may be selected to model: (i) coupling a first power cable to an input line, wherein the first power cable is coupled to a first power source, (ii) decoupling the first power cable from the input line, and (iii) coupling a second power cable to the input line, where the second power cable is coupled to a second power source.

The voltage drop may include the low-voltage level staying below 2 V for at least 500 ms. The first high-voltage level, the low-voltage level, or the second high-voltage level may be selected to model a voltage drop at the input line due to a power failure. Moreover, the identifying, disabling, determining, and enabling operations occur while the first PSU is coupled to the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
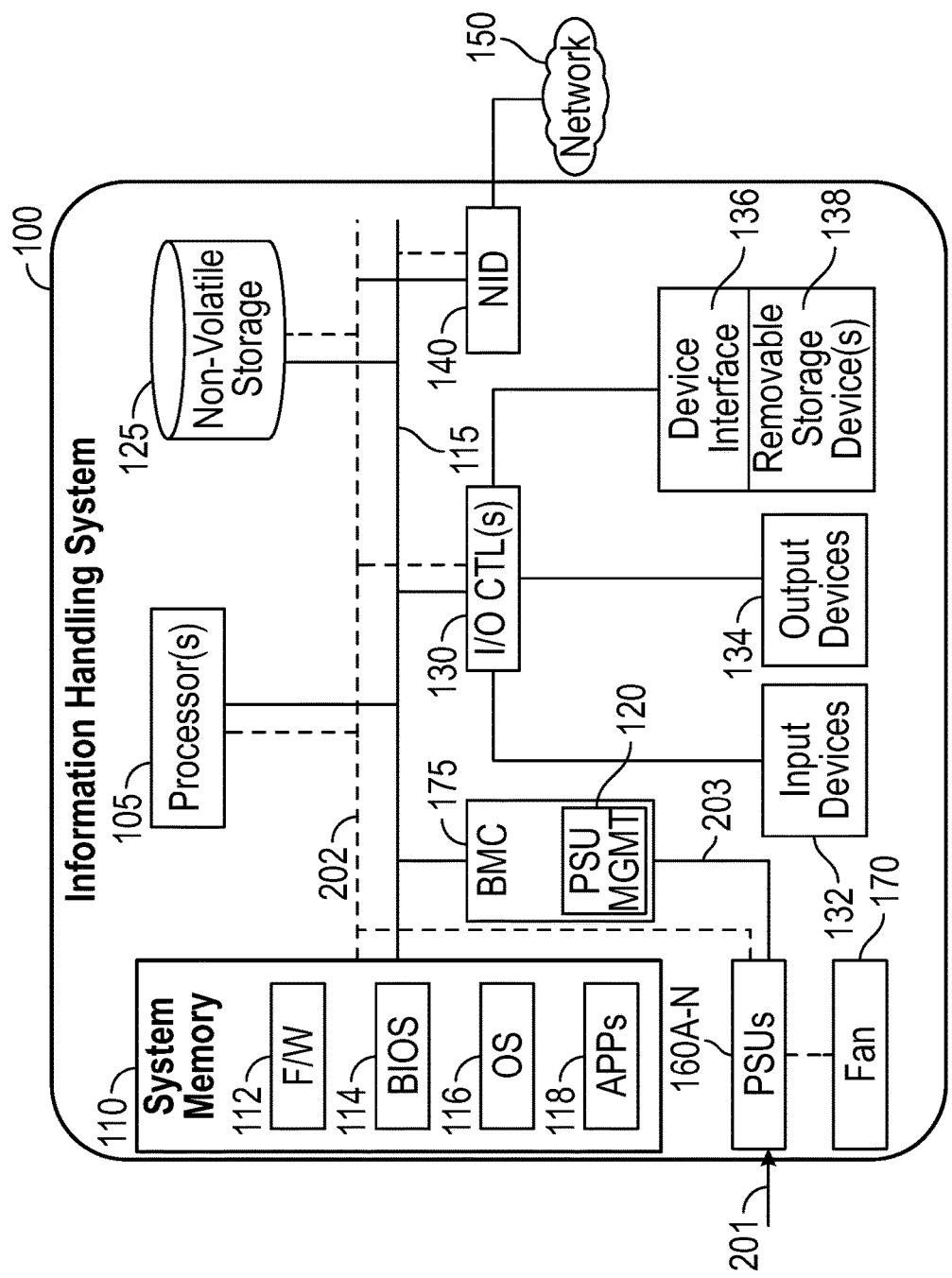
FIG. 1 is a block diagram of examples of components of an Information Handling System (IHS), according to some embodiments.

Embodiments described herein comprise systems and methods for managing the operation of Power Supply Units (PSUs) configured to power an Information Handling System (IHS). In some cases, these systems and methods may determine the line status and power capability of a Power Supply Unit (PSU). If the PSU is disabled in response to the IHS having detected a PSU mismatch condition, for example, but the line status and power capability of the PSU after the detection follows a predetermined pattern, the IHS may (re)enable the PSU without requiring that the PSU first be electrically reset or otherwise de-coupled from the IHS.

In many cases, these systems and methods may enable: determination of line status and power capability of a PSU based on line voltage, recovery from a misapplication of accidental insertion of a incorrect line voltage into a PSU, recovery from a power outage that can cause the PSU to initially latch to a wrong line status condition, and the like. Moreover, these systems and methods may also enable: communication of line status change to the system by toggling an existing AC health ("Eup_OK") flag, communication of line status change through a new register flag(s) ("IPMM STATUS"), and changing a PSU's line status and power capability using a new IPMM command sent to the PSU.

An example of a PSU portfolio available to an IHS manufacturer may include dual-rated (or multiple) PSUs with different output capacities determined by the line voltages applied to their input lines, as shown in Table I below:

TABLE I

| PSU | High-Line AC | Low-Line AC | Power Cord Type |
|---|---|---|---|
| 86 mm 1,100 W | 1,100 W | 1,050 W | C13 |
| 86 mm 1,600 W | 1,600 W | 800 W | C13 |
| 86 mm 2,000 W | 2,000 W | 1,400 W | C19 |
| 86 mm 2,400 W | 2,400 W | 1,400 W | C19 |
| 68 mm 3,000 W | 3,000 W | 1,400 W | C19 |

There are several factors that limit the available amount of power that a PSU can provide to an IHS. One factor is the current rating of a branch power distribution. For example, a 20 A branch power distribution is typically limited to 16 A at nominal voltages by product safety agencies. Therefore, the typical maximum power available is approximately 1,600 W at 100 VAC, and 3,200 W at 200 VAC. PSU efficiency and internal loads (The PSU's own microcontroller, fan, etc.) can further reduce the maximum power available to the IHS.

After an input is applied to the PSU, the PSU may sample the first n cycles of the applied voltage (e.g., 5 cycles) to make a determination of the PSU's operational input line voltage. Once the input line has been characterized, the conventional approach would be to lock the line status, and to not change it again until the PSU is physically removed and/or decoupled from the IHS, so that the PSUs' bias voltages can decay to cause the PSU's internal microprocessor's reset. A reason for conventionally locking the line status is so that the PSU can continue to alert the IHS of input under-voltage warnings and faults, so that the IHS can the take appropriate action (e.g., throttling, reporting, etc.).

The IHS then queries the PSU for its output capability. Because the vast majority of IHSs does not support PSUs with mixed output capabilities, if the output capability of a PSU does not match the output capability of other PSUs coupled to the IHS, then a PSU mismatch condition is identified, and the IHS executes a PSU mismatch algorithm to determine which PSU(s) to disable (i.e., keep the offending or mismatched PSU turned off).

Broadly, PSU mismatch can occur due to different PSU models with different power capabilities being installed in the same IHS. Mismatch may result, for instance, when the line voltages applied are different for similar PSUs with dual-output ratings. Table II describes various actions typically involved depending upon the cause of the PSU mismatch:

TABLE II

| Scenario | User Actions to Resolve PSU Capacity Mismatch |
|---|---|
| PSUs installed with different output rating | PSU with wrong output rating is removed and replaced with correct PSU. |
| Low-line cabling error (high-line intended) | A low-line input is removed from the impacted PSU(s), the impacted PSU(s) is removed and then re-installed in the IHS, and the low-line input is re-cabled to high-line. |
| High-line cabling error (low-line intended) | The high-line input is removed from the impacted PSU(s), the impacted PSU(s) is removed and then re-installed in the IHS, and the high-line input is re-cabled to low-line. |
| High-line brown-out | No action is required. |
| Low-line brown-out | No action is required. |
| Cold start in to high-line system then brown-out | Input must be removed from the impacted PSU(s), the impacted PSU(s) is removed from |

TABLE II-continued

| Scenario | User Actions to Resolve PSU Capacity Mismatch |
|---|---|
| | the IHS, and impacted PSU(s) is re-installed in system after brown-out has passed. |
| Cold start into low-line system then brown-out | No action is required. |

In contrast with the actions outlined in Table II, systems and methods discussed below provide techniques whereby a PSU does not need to be removed from an IHS to reset its power capability after the correct line voltage has been applied. For example, one of these techniques addresses PSU mismatch conditions due to cabling errors. Another one of these techniques covers PSU mismatch due to brown-out conditions. Additionally or alternatively, these techniques may also enable a PSU and an IHS to collaborate to identify and resolve each mismatch scenario of concern.

A line status determination and re-evaluation operation may be briefly described as follows: first, an AC source is coupled to a PSU. If the AC is a reapplication of a previously applied AC source, the PSU already has its line status set, as long as it is being continuously back-powered or biased by another PSU in the same IHS. Otherwise, the PSU may wait until the AC voltage exceeds a minimum power-on level for (e.g., 84 V) to determine if the PSU is operating with a High-Line or Low-Line AC input, in the case of a dual-rated output capacity PSU, such as those in Table I.

Once the PSU's internal bulk capacitor's voltage is charged to a minimal level that supports specified holdup requirements, the PSU may assert the AC health ("Eup_OK") signal provided to the IHS. Then, upon detection of the asserted Eup_OK signal, the IHS may inventory the PSU output capability and execute a PSU mismatch algorithm. If the mismatch algorithm determines that the PSU configuration is valid, the IHS may enable that PSU's 12 V outputs. Conversely, if the PSU configuration is invalid, the IHS may send a Light Emitting Diode (LED) PSU mismatch Power Management Bus (PMBus) command to the PSU(s) deemed invalid. Upon receipt of the LED PSU mismatch PMBus command, the PSU(s) respond with a defined LED behavior (e.g., 5 blinks and turn off) to notify a user that the PSU is invalid.

In various embodiments, in response to a loss of back-up power or secondary bias, and/or upon reception of the LED PSU mismatch PMBus command, one or more trigger conditions may be armed, which then cause the PSU to re-evaluate its input line voltage and corresponding power capability.

For example, if the back-power or secondary bias is lost, a PSU may power up with the application of AC as if it was the first time that it has been powered on.

Additionally or alternatively, the input line status may be re-evaluated in response to a line voltage change. In this condition, the input line voltage drops out and power returns at a low-line level to which the PSU reports its input line status as a low line. However, if the line voltage continues to rise and finally reaches steady state at a high-line level, the PSU may notify the IHS. The IHS may in turn direct the PSU to re-evaluate its input line status. The previous PSU mismatch condition is now cleared, and the IHS may enable the PSU.

Additionally or alternatively, the input line status may be re-evaluated in response to a brown-out condition (e.g., the input line voltage drops to 2 V or less for 500 ms or more). In this condition, an incorrect line voltage is initially applied to the PSU, which causes the IHS to detect a PSU mismatch. When the power cord is swapped (unplugged and then plugged in to the correct AC source), the PSU may re-evaluate its line voltage and then inform the IHS of the new line by toggling the Eup_OK flag. Once Eup_OK has been re-asserted, the IHS may again enable the PSU.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of components of an Information Handling System (IHS), according to some embodiments. Particularly, IHS 100 includes one or more processor(s) 105 coupled to system memory 110 via system interconnect 115. System interconnect 115 may include any suitable system bus.

System memory 110 may include a plurality of software and/or firmware modules including firmware (F/W) 112, basic input/output system (BIOS) 114, operating system (O/S) 116, and/or application(s) 118. Software and/or firmware module(s) stored within system memory 110 may be loaded into processor(s) 105 and executed during operation of IHS 100.

IHS 100 includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device, a camera, a microphone, or audio speaker(s) (not shown).

Additionally, one or more device interfaces 136, such as an optical reader, a universal serial bus (USB), a card reader, Personal Computer Memory Card International Association (PCMCIA) slot, and/or a high-definition multimedia interface (HDMI), may be included or coupled to IHS 100. Device interface(s) 136 are utilized to enable data to be read from or stored to removable storage device(s) 138, such as a compact disk (CD), digital video disk (DVD), flash drive, or flash memory card. Device interfaces 136 any include General Purpose I/O interfaces such as an Inter-Integrated Circuit ($I^2C$), a System Management Bus (SMBus), or Peripheral Component Interconnect (PCI) buses.

IHS 100 comprises Network Interface Device (NID) 140. NID 140 enables IHS 100 to communicate and/or interface with other devices, services, and components that are located externally to IHS 100. These devices, services, and components can interface with IHS 100 via an external network, such as network 150, which may include a local area network, wide area network, personal area network, the Internet, etc.

IHS 100 further includes two or more PSUs 160A-N. PSUs 160A-N are coupled to BMC 175 via an $I^2C$ bus. BMC 175 enables remote operation control of PSUs 160A-N and other components within IHS 100. PSUs 160A-N power the electronic hardware components of IHS 100 (i.e., processor(s) 105, system memory 110, non-volatile storage 125, NID 140, I/O CTL(s) 130, etc.). To assist with maintaining temperatures within specifications, an active cooling system, such as fan 170 may be utilized.

BMC 175 may be configured to provide out-of-band management facilities for IHS 100. Management operations may be performed by BMC 175 even if IHS 100 is powered off, or powered down to a standby state. BMC 175 may include a processor, memory, an out-of-band network interface separate from and physically isolated from an in-band network interface of IHS 100, and/or other embedded resources.

In certain embodiments, BMC 175 may include or may be part of a Remote Access Controller (e.g., a DELL Remote Access Controller (DRAC) or an Integrated DRAC (iDRAC)). In other embodiments, BMC 175 may include or may be an integral part of a Chassis Management Controller (CMC). PSU MGMT module 120 may include firmware located within BMC 175.

Figure 2:
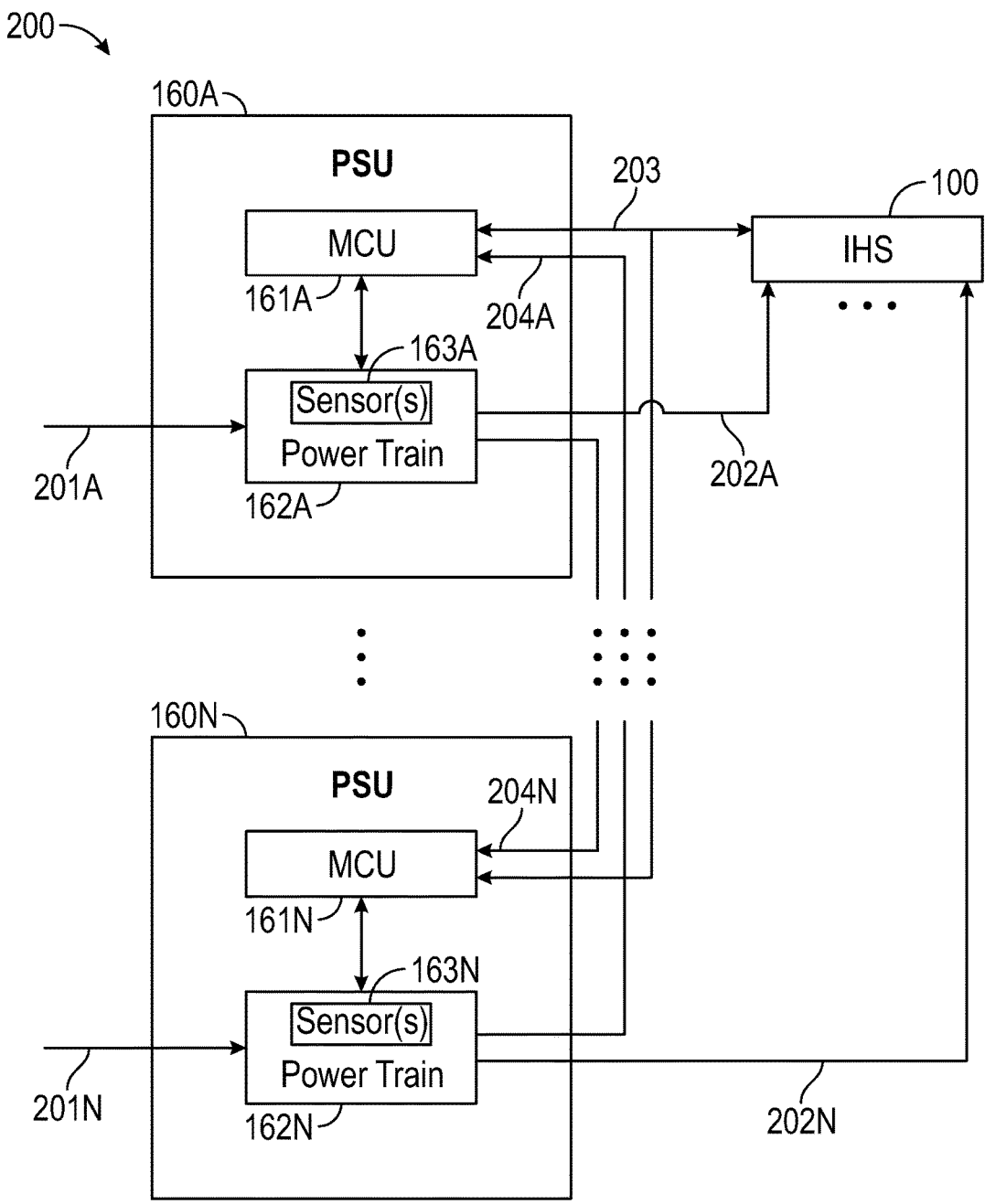
FIG. 2 is a block diagram of examples of components of a Power Supply Unit (PSU), according to some embodiments.

FIG. 2 is a block diagram of examples of components of PSUs 160A-N coupled to IHS 100. Generally speaking, each PSU 160 includes a system, device, or apparatus configured to supply electrical power to one or more electronic hardware components of IHS 100.

Particularly, each of PSUs 160A-N includes a respective one of microcontrollers (MCUs) 161A-N, power trains 162A-N, and sensor(s) 163A-N. Each PSU 160 includes a respective one of input lines 201A-N and main output lines 202A-N. In this case, PSU 160A receives backup power or secondary bias 204A from PSU 160N, and PSU 160N receives backup power or secondary bias 204N from PSU 160A.

Each MCU 161 is coupled to BMC 175 within IHS 100 via control bus 203. Moreover, each MCU 161 may comprise a microprocessor, DSP, ASIC, FPGA, EEPROM, or any combination thereof, or any other device, system, or apparatus for controlling operation of its associated PSU 160. As such, each MCU 161 may comprise firmware, logic, and/or data for controlling the operation of PSU 160.

Each power train circuit 162 may include a suitable system, device, or apparatus for converting electrical energy received by each PSU 160 (e.g., a 120 or 240 VAC source) into electrical energy usable by IHS 100 (e.g., as a 5 or 12 VDC source). In some embodiments, each power train circuit 162 may comprise a rectifier and/or a voltage regulator (e.g., a multi-phase voltage regulator).

Each of sensor(s) 163 may be communicatively coupled to a corresponding MCU 161 and may include any system, device, or apparatus configured to communicate a signal to MCU 161 indicative of a temperature of power train circuit 162 (e.g., a converter, a heatsink, a transistor, etc.), an ambient temperature (e.g., an IHS chassis' inlet air temperature), an electrical voltage or current at an input line 201, and/or an electrical voltage or current at an output line 202.

Figure 3A:
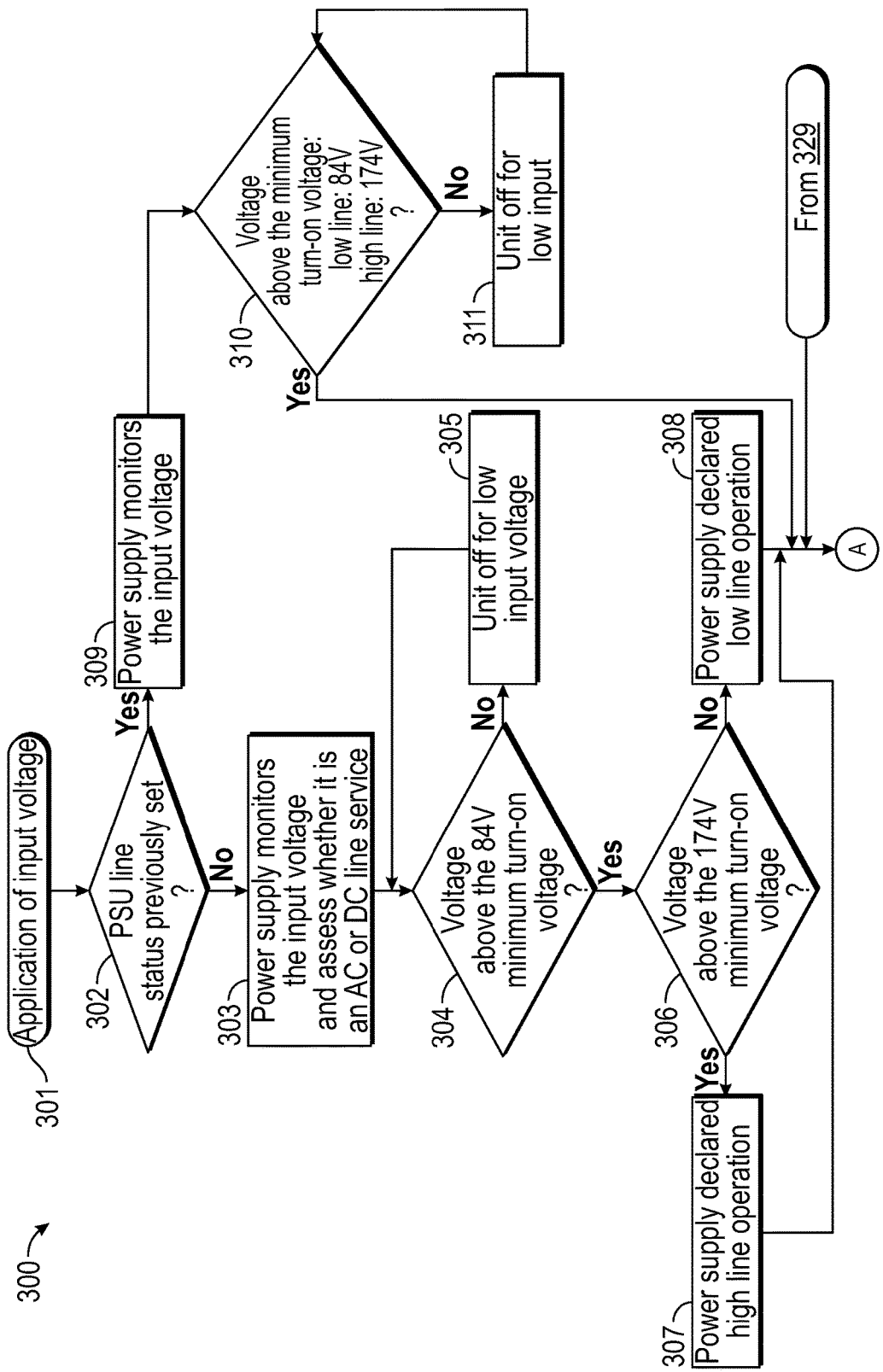
FIGS. 3A-C are flowcharts illustrating an example of a method for managing the operation of PSUs, according to some embodiments.
Figure 3A:
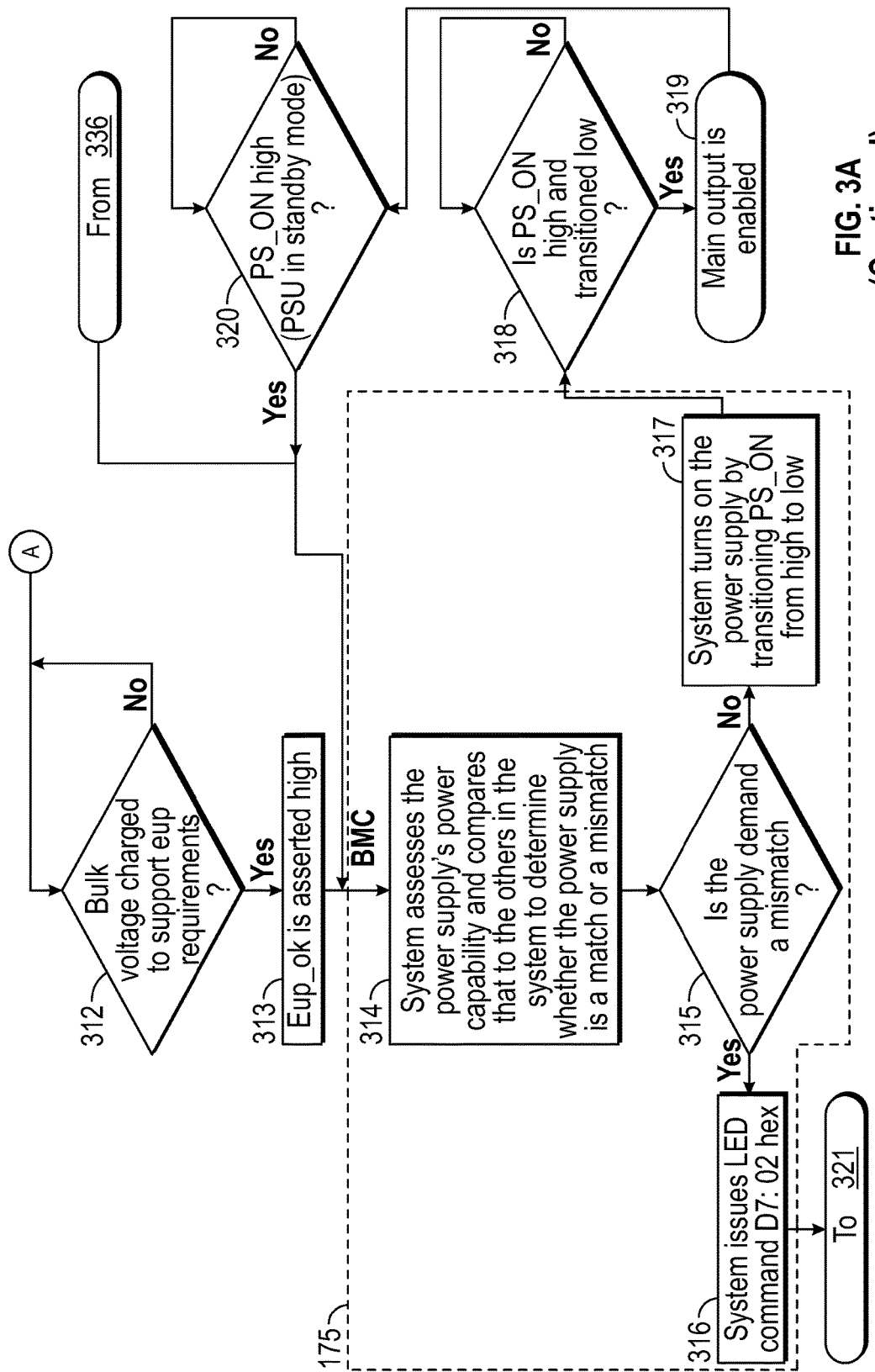
Figure 3B:
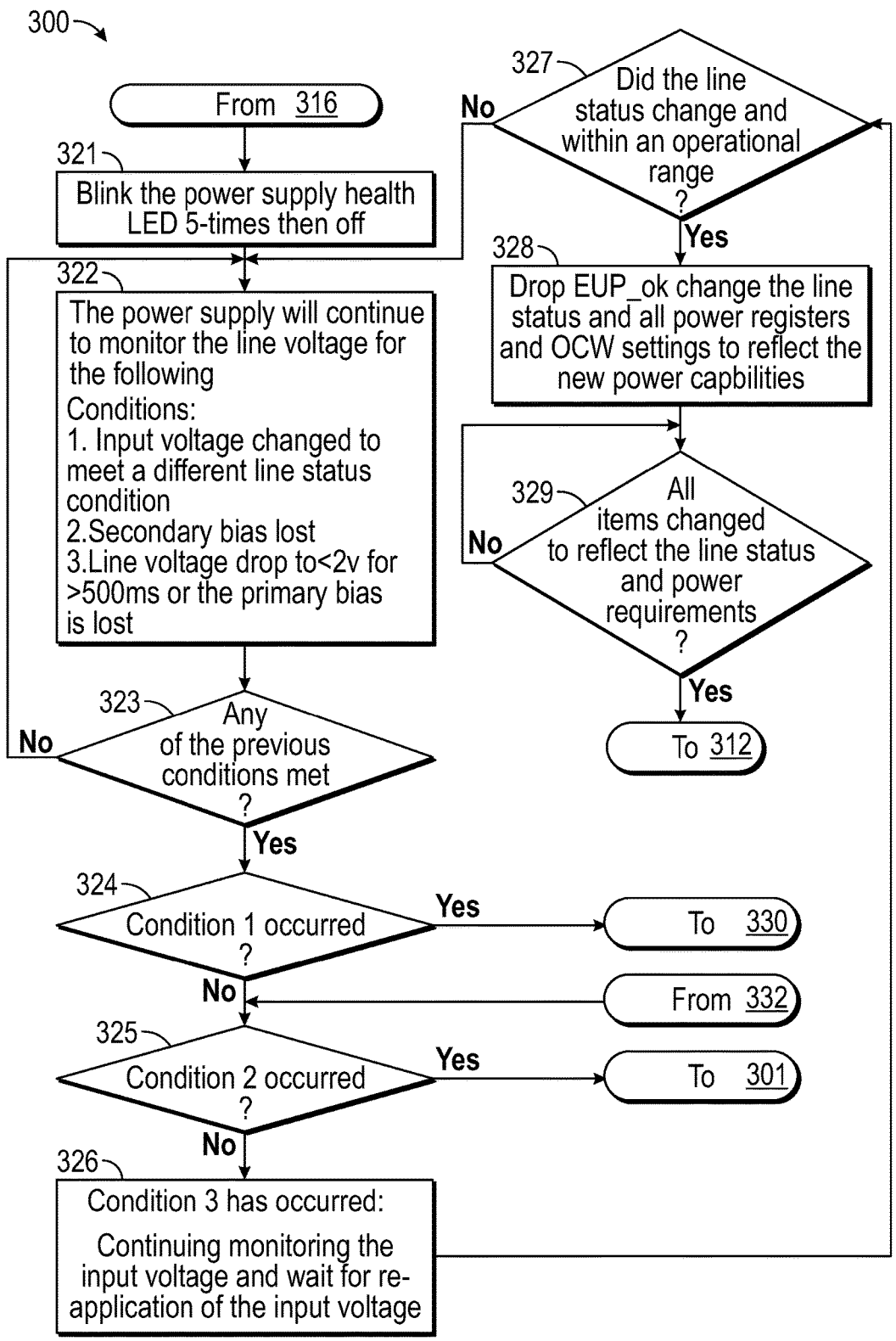
Figure 3C:
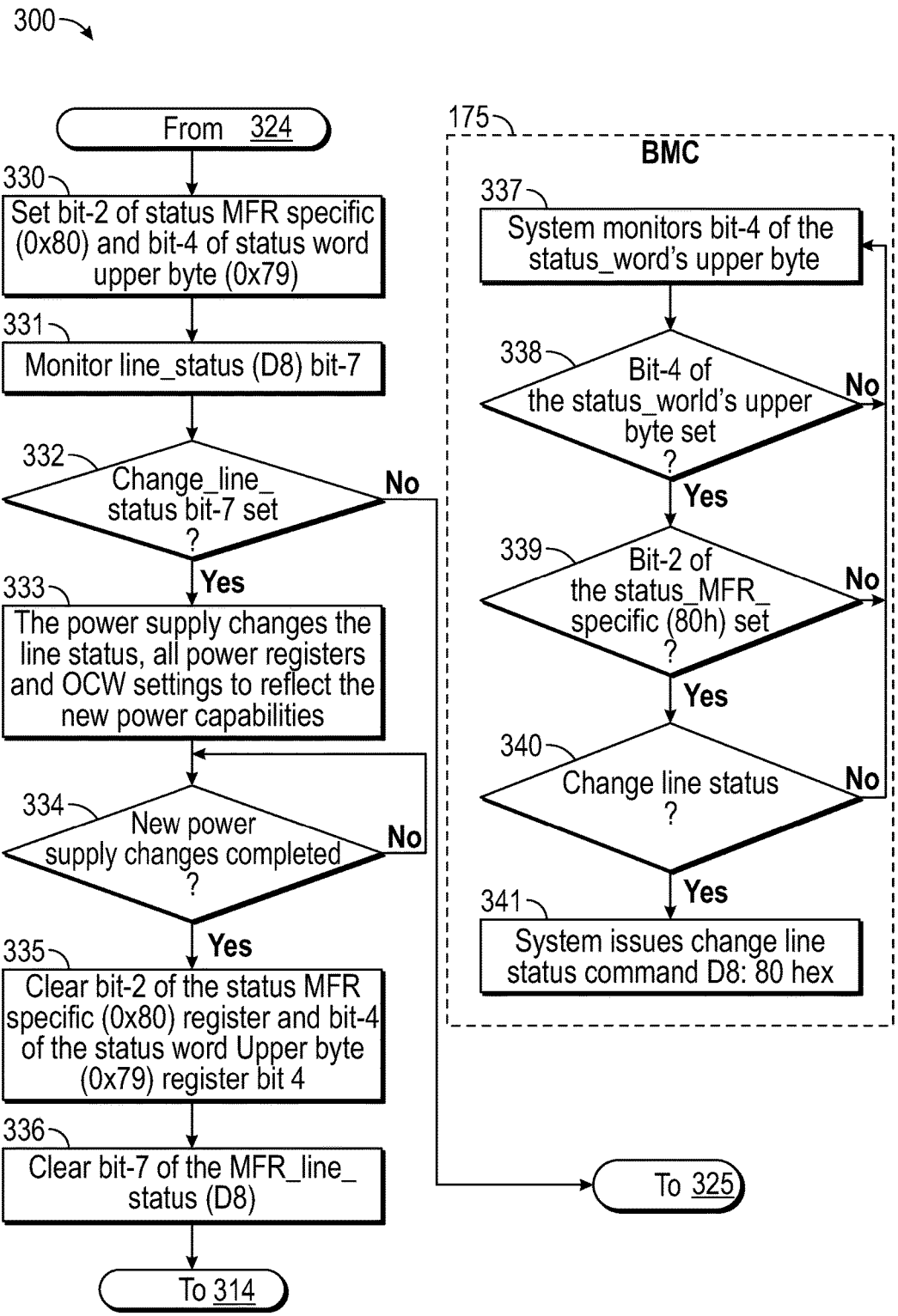

FIGS. 3A-C are flowcharts illustrating method 300 for managing the operation of PSUs 160. For example, method 300 may be used for enabling a mismatched one of PSUs 160A-N after detection of the mismatch condition. In some embodiments, BMC 175 may be communicate with MCUs 161A-N of PSUs 160A-N to exchange control and/or sensor telemetry information in order to implement method 300. In this example, except where described as being performed by BMC 175, all other operations of method 300 may be performed by MCU 161 of PSU 160.

Method 300 begins at block 301, with the application (or re-application) of an input voltage to a PSU's input line, typically accomplished by coupling a power cable between an AC source and an electrical connector on the PSU. At block 302, method 300 determines whether the PSU's line status has been previously set. If not, at block 303 the PSU monitors its input voltage 201 and assesses whether it is an AC or DC input.

Block 304 determines if the input voltage is above the minimum turn-on voltage for a low-level line (e.g., 84 V). If not, block 305 keeps the PSU off for low input voltage, and control returns to block 304. Then, block 306 determines whether the input voltage is above a minimum turn-on voltage for a high-level line (e.g., 174 V). If so, at block 307, the PSU reports a high-line status to the BMC. If not, at block 308, the PSU reports a low-line status to the BMC.

Returning to block 302, if the PSU's line status has been previously set, the PSU monitors the input voltage at block 309. If block 310 determines that the voltage at the input line is not above the minimum turn-on voltage for a low-level line or a high-level line, block 311 keeps the PSU off for low-level input. Otherwise, control passes to block 312.

Block 312 determines whether a bulk capacitor's voltage, typically part of the PSU's power train circuitry 162, is sufficiently charged to support AC health ("Eup_Ok") requirements. If not, control stays with block 312 until that condition is met. Once the PSU's bulk capacitor is charged, however, block 313 asserts the Eup_OK signal or flag.

Blocks 314-317 may be performed by BMC 175 as part of a mismatch detection algorithm based upon the reporting performed by the PSUs. At block 314, BMC 175 determines the PSU's power capability and compares that to the others in the same IHS to determine whether the PSU is mismatched. If block 315 determines that a mismatch condition exists (e.g., two PSU reported a high-level input line, but a third, mismatched PSU reported a low-level line), block 316 issues an LED command (e.g., D7:02 hex), and method 300 proceeds to block 321. Otherwise, block 317 turns on the PSU by transitioning a PS-ON flag or signal from high to low (active low).

Back to the PSU's operation, block 318 determines whether the PS-ON flag is transitioned to low. If so, block 319 enables the PSU's main output, otherwise control stays with block 318. After the PSU main output is enabled, the PSU enters a PS-ON monitoring state, block 320. As long as PS-ON is low the PSU will remain in block 320. When the PSU detects the PS-ON flag is set to high it transitions standby mode and re-enters block 314

At block 321, the PSU may blink its LED a number of times, and then turns the LED off. At block 322, the PSU continues to monitor its input line voltage, using one or more sensors, for any (or all) of the following conditions: (1) the input voltage has changed, (2) a secondary bias has been lost, or (3) the line voltage has dropped. Each of these conditions is associated with a particular voltage profile indicative of a sequence of events that caused the PSU mismatch condition; and which, if/when recovered or resolved, permit that the PSU be enabled (or re-enabled) without requiring that the PSU be physically disconnected from the IHS.

Block 323 determines whether any of conditions (1)-(3) have been met. If not, control returns to block 322. If so, block 324 determines whether condition (1) has occurred. If so, control passes to block 330. If not, block 325 determines whether condition (2) has occurred. If so, control passes to block 301. If not, block 326 identifies condition (3) as having occurred, and continues monitoring the input line voltage, and waits for re-application of the input voltage.

If block 327 determines that the line status changed outside of an operational range, control returns to block 322. Conversely, if block 327 determines that the line status remains within the operational range, block 328 flips the Eup_OK flag and changes its input line status, power registers, and/or settings to reflect the newly detected power capabilities. Then, if block 329 determines that all items have changed, control passes to block 312, otherwise control remains within block 329 until that condition is met.

In this non-limiting example, at block 330, the PSU sets bit-2 of a Status MFR-Specific control word, as well as bit-4 of a Status_Word's Upper Byte (0x79). At block 331, the PSU monitors bit-7 of the MFR_Line_Status (D8). If block 332 determines that bit-7 of the MFR_Line_Status word has not been set, control passes to block 325. Otherwise, at block 333, the PSU changes its input line status, power registers, and/or settings to reflect the newly detected power capabilities.

If block 334 determines that PSU changes have been completed, control passes to block 335; otherwise control remains with block 334 until that condition is met. Block 335 clears bit-2 of the Status_MFR_Specific control word, as well as register bit-4 of the Status_Word's Upper Byte. Finally, block 336 clears the MFR_Line_Status bit-7, and control returns to block 314.

In addition to operations 301-336, method 300 may also involve operations 337-341, which may be performed by BMC 175. At block 337, BMC 175 monitors register bit-4 of the Status_Word's Upper Byte. If block 338 determines that register bit-4 of the Status_Word's Upper Byte is not set, control returns to block 337. If block 339 determines that bit-2 of the Status_MFR_Specific control word has not been set, control returns to block 337. And if block 340 determines that there has not been a change in line status, control also returns to block 337. But, if the conditions of blocks 338-340 have all been met, then block 341 issues a Change Line Status Command, configured to change the line status of the PSU.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
    identifying a mismatch between a first Power Supply Unit (PSU) and a second PSU in an Information Handling System (IHS);
    disabling the first PSU;
    determining that a voltage at an input line of the first PSU follows a predetermined pattern while the first PSU receives a secondary bias from the second PSU; and
    enabling the first PSU.

2. The method of claim 1, wherein the mismatch is identified by a Baseband Management Controller (BMC) coupled to the first and second PSUs.

3. The method of claim 2, wherein the mismatch is identified based upon a comparison between a line status of the input line reported to the BMC by the first PSU, and another line status of another second input line reported to the BMC by the second PSU.

4. The method of claim 1, wherein the predetermined pattern comprises:
    a drop from a first high-voltage level to a low-voltage level; and
    a rise from the low-voltage level to a second high-voltage level.

5. The method of claim 4, wherein the low-voltage level is 0 V.

6. The method of claim 5, wherein at least one of: the first high-voltage level, the low-voltage level, or the second high-voltage level is selected to model: (i) coupling a power cable to a first power source, wherein the power cable is coupled to an input line, (ii) decoupling the power cable from the first power source, and (iii) coupling the power cable to a second power source.

7. The method of claim 6, wherein the second high-voltage level has a higher value than the first high-voltage level.

8. The method of claim 5, wherein at least one of: the first high-voltage level, the low-voltage level, or the second high-voltage level is selected to model: (i) coupling a first power cable to an input line, wherein the first power cable is coupled to a first power source, (ii) decoupling the first power cable from the input line, and (iii) coupling a second power cable to the input line, wherein the second power cable is coupled to a second power source.

9. The method of claim 4, wherein the voltage drop includes the low-voltage level staying below 2 V for at least 500 ms.

10. The method of claim 9, wherein at least one of: the first high-voltage level, the low-voltage level, or the second high-voltage level is selected to model a voltage drop at the input line due to a power failure.

11. The method of claim 1, wherein the identifying, disabling, determining, and enabling operations occur while the first PSU is coupled to the IHS.

12. A hardware memory device having program instructions stored thereon that, upon execution by a Baseband Management Controller (BMC) of an Information Handling System (IHS), cause the BMC to:
    identify a first mismatch between a first line status of a first input line of a first Power Supply Unit (PSU) and a second line status of a second input line of a second PSU, wherein the first and second PSUs are configured to provide power to the IHS, and wherein the second PSU provides a secondary bias to the first PSU;
    disable the first PSU in response to the mismatch; and
    enable the first PSU in response to an evaluation of the first input line without loss of the secondary bias.

13. The hardware memory device of claim 12, wherein the first line status is reported to the BMC by the first PSU, wherein the second line status is reported to the BMC by the second PSU, and wherein the evaluation is performed by the first PSU.

14. The hardware memory device of claim 12, wherein to perform the evaluation, the first PSU determines that a voltage at the first input line drops from a first high-voltage level to a low-voltage level, and then rises from the low-voltage level to a second high-voltage level.

15. The hardware memory device of claim 14, wherein at least one of: the first high-voltage level, the low-voltage level, or the second high-voltage level, is selected to model at least one of:
    (a) coupling a power cable to a first power source, wherein the power cable is coupled to the input line, (b) decoupling the power cable from the first power source, and (c) coupling the power cable to a second power source; or
    (ii) (a) coupling a first power cable to the first input line, wherein the first power cable is coupled to a first power source, (b) decoupling the first power cable from the first input line, and (c) coupling a second power cable to the first input line, wherein the second power cable is coupled to a second power source.

16. The hardware memory device of claim 14, wherein at least one of: the first high-voltage level, the low-voltage level, or the second high-voltage level, is selected to model a voltage drop at the first input line due to a power failure.

17. An Information Handling System (IHS), comprising:
    a first Power Supply Unit (PSU);
    a second PSU coupled to the first PSU and configured to provide a secondary bias to the first PSU; and
    a Baseband Management Controller (BMC) coupled to the first and second PSUs, wherein the BMC is configured to:
        identify a mismatch between a first line status of a first input line of the first PSU and a second line status of a second input line of the second PSU;
        disable the first PSU in response to the mismatch; and
        enable the first PSU in response to an evaluation of the first input line without loss of the secondary bias by the first PSU, wherein to perform the evaluation, the first PSU is configured to determine that: a voltage at an input voltage at the first input line drops from a first high-voltage level to a low-voltage level, and subsequently rises from the low-voltage level to a second high-voltage level.

18. The IHS of claim 17, wherein the mismatch is identified in response to the first PSU having latched to the first input line before the first input line reached a steady state.

19. The IHS of claim 17, wherein at least one of: the first high-voltage level, the low-voltage level, or the second high-voltage level, is selected to model at least one of:
- (iii) (a) coupling a power cable to a first power source, wherein the power cable is coupled to the input line, (b) decoupling the power cable from the first power source, and (c) coupling the power cable to a second power source; or
- (i) (a) coupling a first power cable to the first input line, wherein the first power cable is coupled to a first power source, (b) decoupling the first power cable from the first input line, and (c) coupling a second power cable to the first input line, wherein the second power cable is coupled to a second power source.

20. The IHS of claim 17, wherein at least one of: the first high-voltage level, the low-voltage level, or the second high-voltage level, is selected to model a voltage drop at the first input line due to a mains power failure.

* * * * *